(12) United States Patent
Yokoyama et al.

(10) Patent No.: US 11,707,713 B2
(45) Date of Patent: Jul. 25, 2023

(54) INFORMATION MANAGEMENT SYSTEM, CARBON DIOXIDE COLLECTION STATION, AND INFORMATION MANAGEMENT DEVICE

(71) Applicant: TOYOTA JIDOSHA KABUSHIKI KAISHA, Toyota (JP)

(72) Inventors: Daiki Yokoyama, Gotemba (JP); Hiroshi Otsuki, Gotemba (JP); Takahiro Suzuki, Susono (JP); Harumi Gotou, Susono (JP); Shingo Korenaga, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 343 days.

(21) Appl. No.: 17/038,142

(22) Filed: Sep. 30, 2020

(65) Prior Publication Data

US 2021/0138399 A1    May 13, 2021

(30) Foreign Application Priority Data

Nov. 7, 2019  (JP) .................................. 2019-202558

(51) Int. Cl.
*B01D 53/62* (2006.01)
*F01N 3/00* (2006.01)
(Continued)

(52) U.S. Cl.
CPC ............... *B01D 53/62* (2013.01); *F01N 3/00* (2013.01); *G06F 16/2457* (2019.01);
(Continued)

(58) Field of Classification Search
CPC ..... B01D 53/62; B01D 2257/504; F01N 3/00; F01N 3/0857; F01N 2570/10;
(Continued)

(56) References Cited

U.S. PATENT DOCUMENTS 9,581,062 B2    2/2017  Hamad et al.

FOREIGN PATENT DOCUMENTS

JP    2006-167615 A    6/2006
JP    2010-97363 A    4/2010
(Continued)

*Primary Examiner* — An T Nguyen
(74) *Attorney, Agent, or Firm* — Oblon, McClelland, Maier & Neustadt, L.L.P.

(57) ABSTRACT

An information management system includes: a plurality of $CO_2$ recovery devices configured to recover $CO_2$; a $CO_2$ collection station configured to collect $CO_2$ recovered by the plurality of $CO_2$ recovery devices; a $CO_2$ using facility configured to use $CO_2$ collected at the $CO_2$ collection station; and an information management device including a communication unit configured to transmit linked information in which intended use information indicating intended use of $CO_2$ in the $CO_2$ using facility and an amount of use for the intended use is linked with identification information of a user of each of the plurality of $CO_2$ recovery devices to an information communication terminal used by the user.

13 Claims, 14 Drawing Sheets

(51) Int. Cl.
  *H04W 4/80* (2018.01)
  *G06F 16/2457* (2019.01)
  *G06F 16/22* (2019.01)

(52) U.S. Cl.
  CPC ......... *H04W 4/80* (2018.02); *B01D 2257/504* (2013.01); *G06F 16/2282* (2019.01)

(58) Field of Classification Search
  CPC .. G06F 16/2457; G06F 16/2282; H04W 4/80; Y02T 10/12
  See application file for complete search history.

(56) References Cited

FOREIGN PATENT DOCUMENTS

| | | | |
|---|---|---|---|
| JP | 2014-509360 A | | 4/2014 |
| JP | 2021033736 A | * | 3/2021 |

* cited by examiner

FIG.2A
FIG.2B
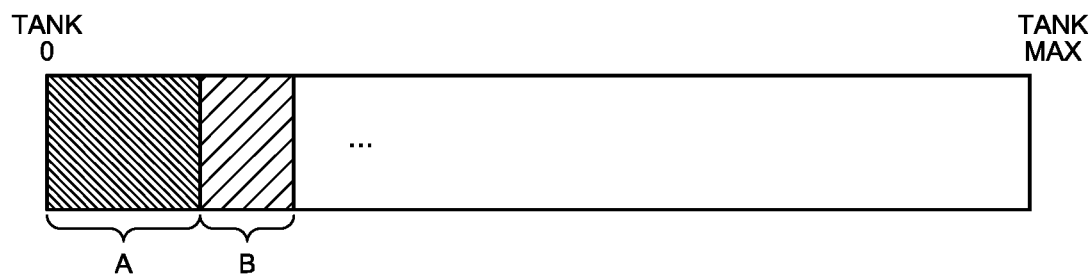
FIG.2C
FIG.2D
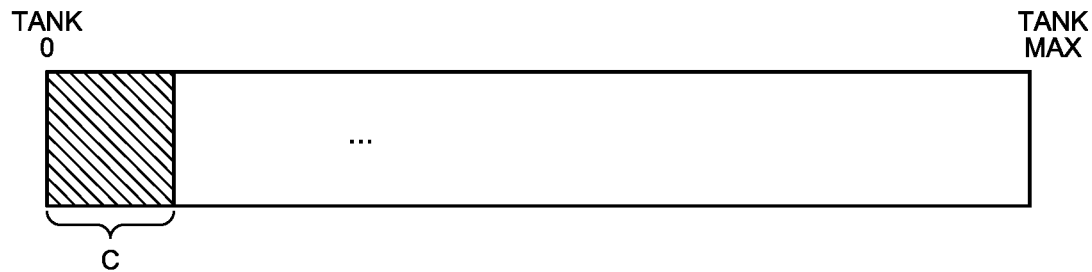

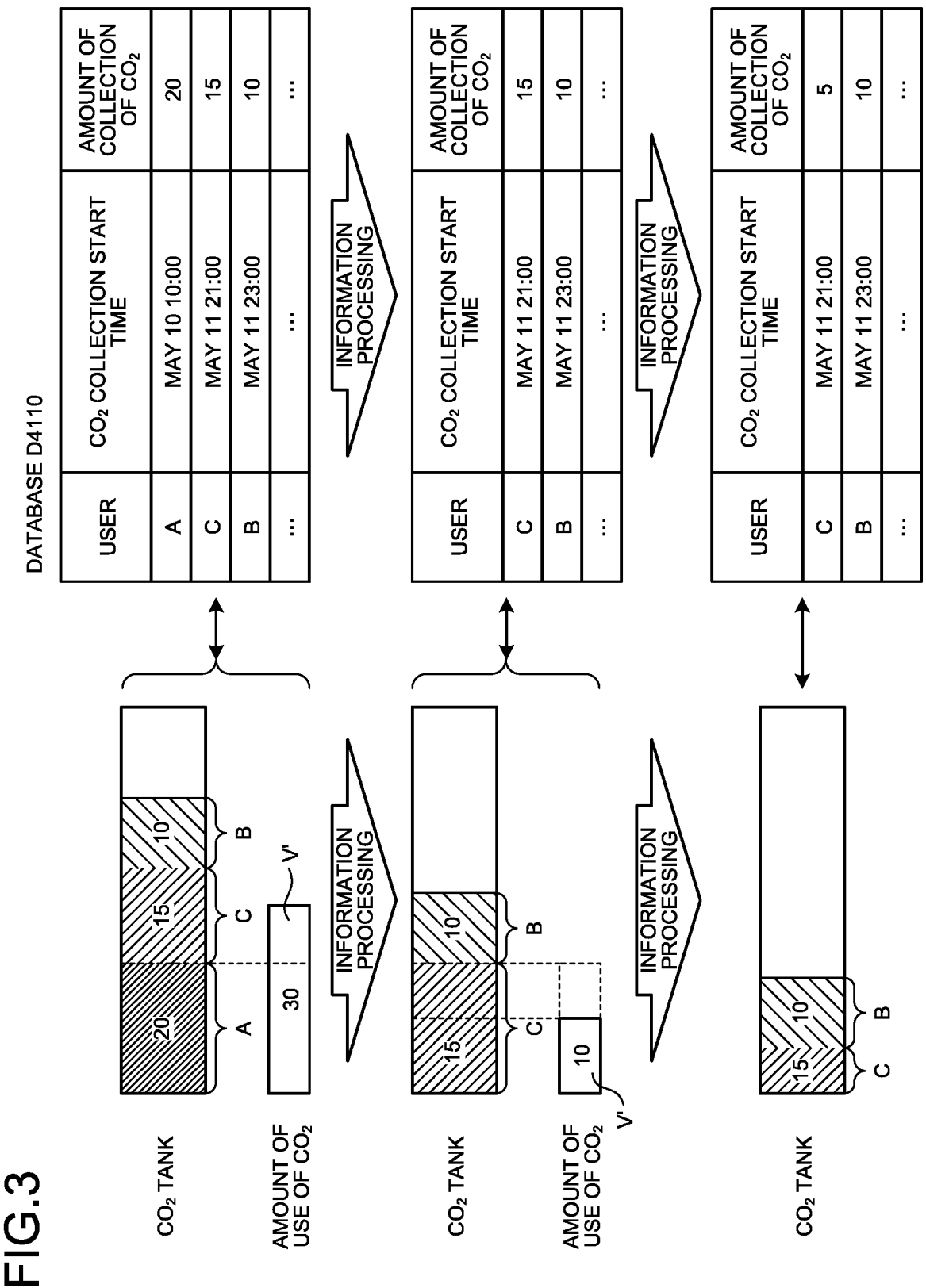

FIG.4

DATABASE F5010

| USER | AMOUNT OF COLLECTION OF $CO_2$ | CONVERSION INTO FUEL | | | | PHOTO-SYNTHESIS | | | TOTAL AMOUNT OF USE OF $CO_2$ |
|---|---|---|---|---|---|---|---|---|---|
| A | ...g | MAY 24 | ...g | JUNE 5 | ... | JULY 23 | ...g | ... | ...g |
| B | ...g | MAY 20 | ...g | JUNE 1 | ... | JUNE 15 | ...g | ... | ...g |
| C | ...g | APRIL 4 | ...g | JULY 13 | ... | JULY 23 | ...g | ... | ...g |
| ... | | | | | | | | | |

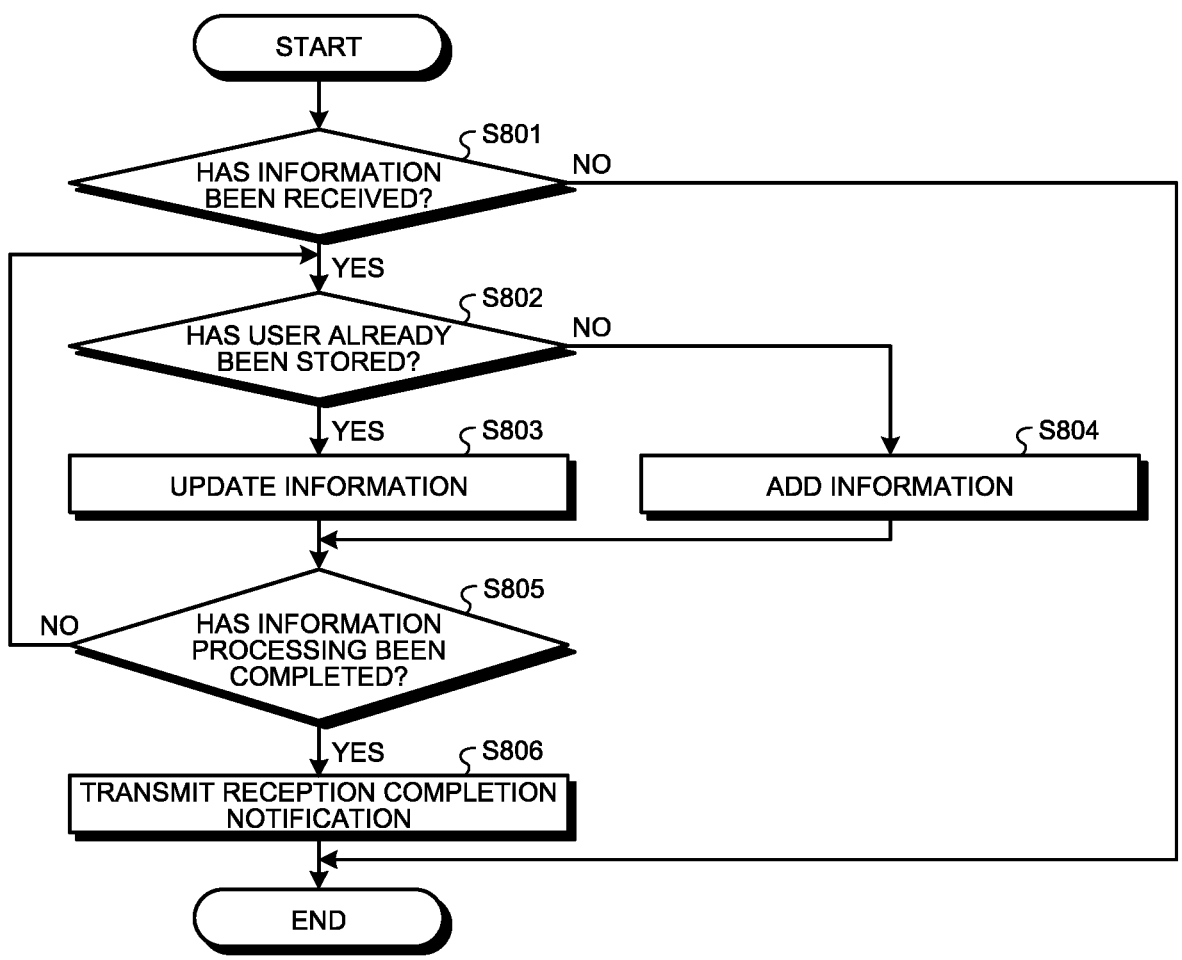

INFORMATION MANAGEMENT SYSTEM, CARBON DIOXIDE COLLECTION STATION, AND INFORMATION MANAGEMENT DEVICE

The present application claims priority to and incorporates by reference the entire contents of Japanese Patent Application No. 2019-202558 filed in Japan on Nov. 7, 2019.

BACKGROUND

The present disclosure relates to an information management system, a $CO_2$ using facility, a $CO_2$ collection station, an information management device, a vehicle, a building, and an information communication terminal.

There has been known a $CO_2$ recovery system that reduces the amount of $CO_2$ emitted from vehicles by using a $CO_2$ recovery device that captures and stores carbon dioxide ($CO_2$) emitted from vehicles (JP 2014-509360 A).

SUMMARY

In the $CO_2$ recovery system described in JP 2014-509360 A, it is assumed that $CO_2$ recovered from a vehicle having a $CO_2$ recovery device is collected at another place such as a $CO_2$ collection station, and the collected $CO_2$ is used for conversion into fuel. However, there has not been disclosed information management technology for informing a user who uses the $CO_2$ recovery device of information such as the intended use and amount of use of $CO_2$ collected from the $CO_2$ recovery device.

There is a need for an information management system that is capable of informing a user who uses a $CO_2$ recovery device of information such as the intended use and amount of use of $CO_2$ recovered from the $CO_2$ recovery device, and a $CO_2$ using facility, a $CO_2$ collection station, an information management device, a vehicle, a building, and an information communication terminal that are suitable for constructing the information management system.

According to one aspect of the present disclosure, there is provided an information management system including: a plurality of $CO_2$ recovery devices configured to recover $CO_2$; a $CO_2$ collection station configured to collect $CO_2$ recovered by the plurality of $CO_2$ recovery devices; a $CO_2$ using facility configured to use $CO_2$ collected at the $CO_2$ collection station; and an information management device including a communication unit configured to transmit linked information in which intended use information indicating intended use of $CO_2$ in the $CO_2$ using facility and an amount of use for the intended use is linked with identification information of a user of each of the plurality of $CO_2$ recovery devices to an information communication terminal used by the user.

BRIEF DESCRIPTION OF THE DRAWINGS

FIGS. 2A to 2D are explanatory diagrams of a database B of a $CO_2$ collection station according to the first embodiment;

FIG. 3 is an explanatory diagram of information processing in a processing plant according to the first embodiment;

FIG. 4 is an explanatory diagram of a database F of an information management center according to the first embodiment;

FIG. 10B is a control flowchart performed by the information management center according to the first embodiment;

DETAILED DESCRIPTION

Hereinafter, an embodiment will be described with reference to the drawings.

Information Management System

Figure 1:
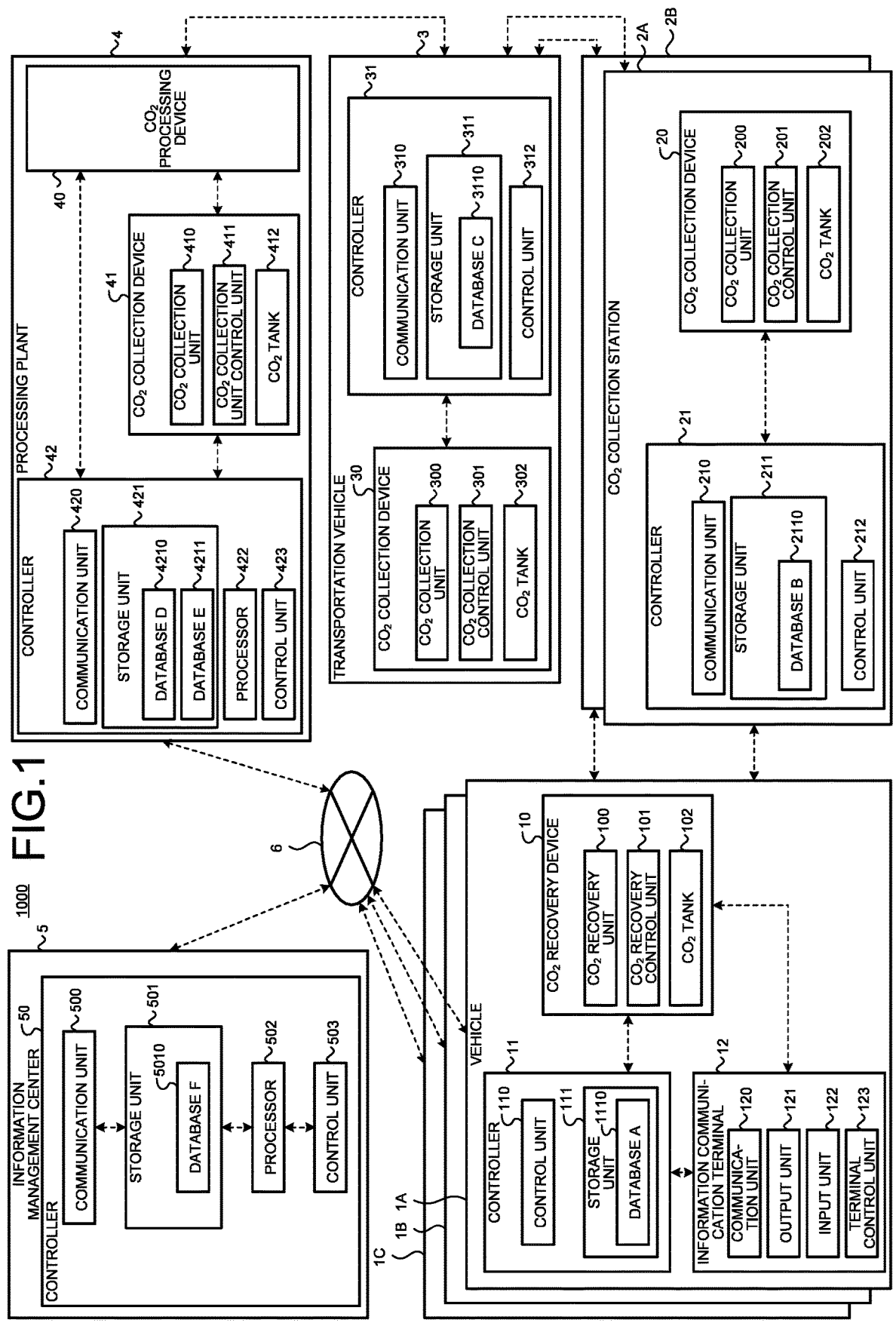
FIG. 1 is a block diagram illustrating an information management system according to a first embodiment.

FIG. 1 is a block diagram illustrating an information management system according to a first embodiment. An information management system 1000 includes three vehicles 1A, 1B, and 1C as an example of a plurality of vehicles, two $CO_2$ collection stations 2A and 2B as an example of a plurality of $CO_2$ collection stations, a transportation vehicle 3, a processing plant 4, an information management center 5, and a communication network 6. In the first embodiment, a description will be given assuming that among the vehicles 1A, 1B, and 1C, the vehicle 1A is appropriately used as a representative, among the $CO_2$ collection stations 2A and 2B, the $CO_2$ collection station 2A is appropriately used as a representative, and the processing plant 4 is used as an example of a $CO_2$ using facility. Other vehicles 1B and 1C may have the same configuration as the vehicle 1A. The $CO_2$ collection station 2B may have the same configuration as the $CO_2$ collection station 2A.

Vehicle

The vehicle 1A includes a $CO_2$ recovery device 10, a controller 11, and an information communication terminal 12. The $CO_2$ recovery device 10, the controller 11, and the information communication terminal 12 are communicably connected to each other using an in-vehicle network such as CAN (controller area network).

The $CO_2$ recovery device 10 includes a $CO_2$ recovery unit 100, a $CO_2$ recovery control unit 101, and a $CO_2$ tank 102. The $CO_2$ recovery unit 100 recovers exhaust gas emitted from the vehicle 1A or $CO_2$ gas contained in the atmosphere by, for example, the method described in JP 2014-509360 A, that is, the method such as chemical adsorption or physical adsorption. The $CO_2$ recovery unit 100 discharges the recovered $CO_2$ to the $CO_2$ collection station. The $CO_2$ tank 102 stores the $CO_2$ recovered by the $CO_2$ recovery unit 100. The $CO_2$ recovery control unit 101 controls the start and end of $CO_2$ recovery of the $CO_2$ recovery unit 100 according to the storable amount of the $CO_2$ tank 102 and the like. The $CO_2$ recovery control unit 101 includes a computation processing unit such as a CPU (central processor) and an FPGA (field-programmable gate array), and a storage unit that includes a ROM (read only memory) storing a program executed by the computation processing unit and various data and a RAM (random access memory) as a work space for computation processing. The $CO_2$ recovery control unit 101 executes the control described above by the computation processing unit executing the program stored in the storage unit. The $CO_2$ recovery unit 100 also includes a connection sensor that detects whether the $CO_2$ recovery unit 100 is connected to the $CO_2$ collection station 2A.

The $CO_2$ tank 102 is a tank that compresses and stores $CO_2$ recovered by the $CO_2$ recovery unit 100. The $CO_2$ tank 102 includes a storage amount sensor that detects a storage amount.

The controller 11 includes a control unit 110 and a storage unit 111.

The control unit 110 includes a computation processing unit such as a CPU, and executes a program stored in the storage unit 111, thus storing information received by a communication unit 120 in the storage unit 111 or transmitting the information in the storage unit 111 from the communication unit 120 included in the information communication terminal 12.

The storage unit 111 includes a main storage unit such as a ROM or a RAM, and stores a program executed by the control unit 110 and various data, and provides a work space for computation processing. Further, the storage unit 111 stores identification information of the user of the $CO_2$ recovery device 10, the amount of $CO_2$ recovered by the $CO_2$ recovery device 10, and information about the intended use of the recovered $CO_2$ in a database A1110. The user of the $CO_2$ recovery device 10 is, for example, the owner of the vehicle 1A including the $CO_2$ recovery device 10. The intended use information will be described in detail later. The storage unit 111 may include a large-capacity auxiliary storage device using a magnetic medium such as an HDD (hard disc drive), an optical medium such as a DVD (digital versatile disc), or a semiconductor memory such as an SSD (solid state drive).

The information communication terminal 12 includes the communication unit 120, an output unit 121, an input unit 122, and a terminal control unit 123.

The communication unit 120 transmits and receives information to and from the information management center 5 via the communication network 6 including a wireless communication network. The communication unit 120 transmits and receives information to and from the $CO_2$ collection station 2 through near-field communication such as WI-FI (registered trademark) or Bluetooth (registered trademark). The communication unit 120 is implemented by, for example, a DCM (data communication module).

The output unit 121 displays or speaks the information about the intended use and amount of use of $CO_2$ received from the information management center 5 by the communication unit 120, and includes, for example, a liquid crystal display or a speaker. The input unit 122 allows a user to input an operation, and includes, for example, a touch panel and a microphone. The information about the intended use and amount of use of $CO_2$ will be described in detail later.

The terminal control unit 123 includes a computation processing unit and a storage unit that stores a program a program executed by the computation processing unit and various data and also provides a work space for computation processing. As the computation processing unit executes the program stored in the storage unit, the information stored in the storage unit 111 is output to the output unit 121, and the input information input from the input unit 122 is output to the control unit 110.

The information communication terminal 12 may be any terminal that may be used by a user and whose output may be checked, and may be achieved by an in-vehicle navigation system and a mobile information communication terminal such as a smartphone or a tablet. The communication unit 120 may be implemented by a communication module mounted on the vehicle 1A, for example, a DCM (data communication module).

$CO_2$ Collection Station

The $CO_2$ collection stations 2A and 2B are stations for collecting $CO_2$ recovered by the $CO_2$ recovery device 10 in any of the vehicles 1A, 1B, and 1C. The $CO_2$ collection station 2A includes a $CO_2$ collection device 20 and a controller 21 that are communicably connected to each other.

The $CO_2$ collection device 20 includes a $CO_2$ collection unit 200, a $CO_2$ collection control unit 201, and a $CO_2$ tank 202.

The $CO_2$ collection unit 200 is connected to the $CO_2$ recovery device 10 of the vehicle 1A to collect $CO_2$ stored in the $CO_2$ tank 102 of the vehicle 1A. The $CO_2$ collection unit 200 is also connected to a $CO_2$ collection device 30 of the transportation vehicle 3 to discharge $CO_2$ stored in the $CO_2$ tank 202 into the transportation vehicle 3. Moreover, the $CO_2$ collection unit 200 includes a connection sensor that detects which of the $CO_2$ collection station 2 and the transportation vehicle 3 is connected to the $CO_2$ collection unit 200.

The $CO_2$ tank 202 is a tank that compresses and stores $CO_2$ collected by the $CO_2$ collection unit 200. The $CO_2$ tank 202 includes a storage amount sensor that detects a storage amount.

The $CO_2$ collection control unit 201 controls the start or end of collection control in the $CO_2$ collection unit 200 based on the storage amount of the $CO_2$ tank 102 in the vehicle 1A and the like. The $CO_2$ collection control unit 201 includes a computation processing unit and a storage unit that stores a program executed by the computation processing unit and various data and provides a work space for computation processing. The $CO_2$ collection control unit 201 executes the above control by the computation processing unit executing the program stored in the storage unit.

The controller 21 includes a communication unit 210, a storage unit 211, and a control unit 212.

The communication unit 210 is a communication module, and transmits and receives information to and from the vehicle 1A or the transportation vehicle 3 through near-field communication.

The storage unit 211 includes a main storage unit, and stores a program executed by the control unit 212 and various data, and provides a work space for computation processing. Further, the storage unit 211 stores identification information of the user of the $CO_2$ recovery device 10 and the amount of $CO_2$ collected from the $CO_2$ recovery device 10 in a database B2110. The storage unit 211 may include a large-capacity auxiliary storage device.

The control unit 212 includes a computation processing unit, and executes the program stored in the storage unit 211, thus causing the communication unit 210 to transmit the information in the storage unit 211 and linking the information received by the communication unit 210 with a $CO_2$ collection start time for storage in the storage unit 211. The $CO_2$ collection start time and the information linked with the $CO_2$ collection start time will be described in detail later.

Transportation Vehicle

The transportation vehicle 3 is a vehicle that transports $CO_2$ from the $CO_2$ collection stations 2A and 2B to the processing plant 4, and is, for example, a tank truck. The transportation vehicle 3 includes the $CO_2$ collection device 30 and a controller 31 that are communicably connected to each other.

The $CO_2$ collection device 30 includes a $CO_2$ collection unit 300, a $CO_2$ collection control unit 301, and a $CO_2$ tank 302.

The $CO_2$ collection unit 300 is connected to the $CO_2$ collection device 20 in the $CO_2$ collection station 2 to collect $CO_2$ stored in the $CO_2$ tank 202 of the $CO_2$ collection station 2A. The $CO_2$ collection unit 300 also discharges $CO_2$ in the $CO_2$ tank 302 of the transportation vehicle 3 into the processing plant 4. Moreover, the $CO_2$ collection unit 300 includes a connection sensor that detects which of the $CO_2$ collection station 2 and the processing plant 4 is connected to the $CO_2$ collection unit 300.

The $CO_2$ tank 302 is a tank that compresses and stores $CO_2$ collected by the $CO_2$ collection unit 300. The $CO_2$ tank 302 includes a storage amount sensor that detects a storage amount.

The $CO_2$ collection control unit 301 controls the start or end of collection control in the $CO_2$ collection unit 300 based on the storage amount of the $CO_2$ tank 202 in the $CO_2$ collection station 2A and the like. The $CO_2$ collection control unit 301 includes a computation processing unit and a storage unit that stores a program executed by the computation processing unit and various data and provides a work space for computation processing. The $CO_2$ collection control unit 301 executes the above control by the computation processing unit executing the program stored in the storage unit.

The controller 31 includes a communication unit 310, a storage unit 311, and a control unit 312.

The communication unit 310 is a communication module, and transmits and receives information to and from the $CO_2$ collection station 2 or the processing plant 4 through near-field communication.

The storage unit 311 includes a main storage unit, and stores a program and various data, and provides a work space for computation processing. Further, the storage unit 311 stores the identification information of the user of the $CO_2$ recovery device 10, the amount of $CO_2$ collected from the user, and a collection start time in a database C3110. The storage unit 311 may include a large-capacity auxiliary storage device.

The control unit 312 executes the program stored in the storage unit 311, thus causing the communication unit 310 to transmit the information in the storage unit 311 or storing the information received by the communication unit 310 in the storage unit 311.

Processing Plant

The processing plant 4 includes a $CO_2$ processing device 40, a $CO_2$ collection device 41, and a controller 42 that are communicably connected to each other.

The $CO_2$ processing device 40 is a processing device capable of processing $CO_2$ or utilizing $CO_2$ as it is, and is a device having a plurality of intended uses such as uses of $CO_2$ for conversion into fuel and photosynthesis of plants. In the present specification, it may be described that $CO_2$ is processed, even when $CO_2$ is used as it is without being processed, such as use for photosynthesis of plants.

The $CO_2$ collection device 41 includes a $CO_2$ collection unit 410, a $CO_2$ collection control unit 411, and a $CO_2$ tank 412.

The $CO_2$ collection unit 410 is connected to the $CO_2$ collection device 30 of the transportation vehicle 3, thus collecting $CO_2$ stored in the $CO_2$ tank 302 of the transportation vehicle 3.

The $CO_2$ tank 412 is a tank that compresses and stores $CO_2$ collected by the $CO_2$ collection unit 410. The $CO_2$ tank 412 includes a storage amount sensor that detects a storage amount.

The $CO_2$ collection control unit 411 controls the start or end of collection control in the $CO_2$ collection unit 410 based on the storage amount of the $CO_2$ tank 302 of the transportation vehicle 3 and the like.

The controller 42 includes a communication unit 420, a storage unit 421, a processor 422, and a control unit 423.

The communication unit 420 is a communication module, and transmits and receives information to and from the transportation vehicle 3 through near-field communication, or transmits and receives information to and from the information management center 5 via the communication network 6.

The storage unit 421 includes a main storage unit, and stores a program and various data, and provides a work space for computation processing. The storage unit 421 includes a database D4210 and a database E4211. The storage unit 421 stores the identification information of the user of the $CO_2$ recovery device 10, the amount of $CO_2$ collected from the $CO_2$ recovery device 10, and the information indicating a $CO_2$ collection start time in the database D4210. The storage unit 421 stores the identification information of the user of the $CO_2$ recovery device 10 and the information about the amount of $CO_2$ collected from the user, these pieces of information being stored in the database D4210, and information indicating the amount of use and intended use of $CO_2$ in the $CO_2$ processing device 40 in the database E4211.

The processor 422 executes the program stored in the storage unit 421 to calculate the amount of $CO_2$ used in the $CO_2$ processing device 40 and perform information processing for linking the information about the amount of use calculated and the intended use with the information in the database D4210.

The control unit 423 executes the program stored in the storage unit 421, thus causing the communication unit 420 to transmit the information in the storage unit 421 or storing the information received by the communication unit 420 in the storage unit 421.

Information Management Center

The information management center 5 has a controller 50 that includes a communication unit 500, a storage unit 501, a processor 502, and a control unit 503 that are communicable with each other.

The communication unit 500 is a communication module, and transmits and receives information to and from the processing plant 4 and the vehicle 1A via the communication network 6.

The storage unit 501 includes a main storage unit, and stores a program and various data, and provides a work space for computation processing. The storage unit 501 also includes a database F5010. The storage unit 501 stores the intended use in the processing plant 4, the amount of use of $CO_2$, and the identification information of the user of the $CO_2$ recovery device 10, these pieces of information being received from the processing plant 4, in the database F5010.

The processor 502 executes the program stored in the storage unit 501 to perform a process such as linking the information newly received from the processing plant 4 with the information in the database F5010 for updating.

The control unit 503 executes the program stored in the storage unit 501, thus causing the communication unit 500 to transmit the information in the storage unit 501 to the vehicle 1A or the processing plant 4.

Control and Information Flow in Information Management System

Control and a flow of information in the information management system 1000 will be described with reference to FIG. 1. In each of the vehicles 1A, 1B, and 1C, the $CO_2$ recovery device 10 recovers $CO_2$. For example, when the $CO_2$ recovery device 10 has recovered a certain amount of $CO_2$, a user of the vehicles 1A, 1B, or 1C goes to the $CO_2$ collection station 2A or 2B. $CO_2$ recovered in the vehicles 1A, 1B, and 1C is collected in the $CO_2$ collection stations 2A and 2B. Along with this collection, the identification information of the user of the $CO_2$ recovery device 10 and the information about the amount of $CO_2$ collected from the $CO_2$ recovery device 10 and a collection start time are linked with each other and stored in the storage unit 211 of the controller 21 in the $CO_2$ collection stations 2A and 2B. The identification information of the user of the $CO_2$ recovery device 10 is transmitted from the storage unit 111 of the controller 11 by the communication unit 120 of the information communication terminal 12 and received by the communication unit 210.

The linked information stored in the storage unit 211 is transmitted to the processing plant 4 via the transportation vehicle 3. In the processing plant 4, the amount of collection of $CO_2$ and the information indicating the intended use in the processing plant 4 and the amount of use of $CO_2$ for the intended use are linked with each other and stored in the storage unit 421 of the controller 42. The linked information stored in the storage unit 421 is transmitted to the information management center 5. The information including the intended use information such as the intended use and amount of use of $CO_2$ that are linked with each other is transmitted from the information management center 5 to the information communication terminal 12 of each of the vehicles 1A, 1B, and 1C including the $CO_2$ recovery device 10. As the information communication terminal 12 displays or speaks the information including the intended use information to notify each user of the $CO_2$ recovery device 10 of the information including the intended use information.

FIGS. 2A to 2D are explanatory diagrams of the database B of the $CO_2$ collection station according to the first embodiment. FIG. 2A illustrates an example of the state of the $CO_2$ tank 202 in the $CO_2$ collection station 2A, and FIG. 2B illustrates the contents of the database B2110 of the $CO_2$ collection station 2A corresponding to FIG. 2A. FIG. 2C illustrates an example of the state of the $CO_2$ tank 202 in the $CO_2$ collection station 2B, and FIG. 2D illustrates the contents of a database B2111 of the $CO_2$ collection station 2B corresponding to FIG. 2C. It is assumed that the $CO_2$ collection station 2A has the $CO_2$ tank 202 having a maximum capacity of (MAX), collects (20) of the amount of $CO_2$ from the vehicle 1A used by a user A, and collects (10) of the amount of $CO_2$ from the vehicle 1B used by a user B. It is assumed that the $CO_2$ collection station 2B has the $CO_2$ tank 202 having a maximum capacity of (MAX), and collects (15) of the amount of $CO_2$ from the vehicle 1C used by a user C. While the unit of the amount of collection is, for example, mass, the unit is a dimensionless unit for the sake of simplicity. At this time, the identification information of the user of the $CO_2$ recovery device 10, the collection start time when the user starts the collection in the $CO_2$ collection station 2, and the amount of collection of $CO_2$ are linked with each other, and stored in the database B2110 of the $CO_2$ collection station 2A and the database B2111 of the $CO_2$ collection station 2B, respectively. The user identification information is information for identifying the user on the information management system 1000, and for example, a registration number corresponding to a user registered in the database of a dealer when the owner of the vehicle 1A has purchased the vehicle 1A including the $CO_2$ recovery device 10 is used. These pieces of information stored in the database B2111 are transmitted to the database C3110 included in the controller 31 of the transportation vehicle 3, and further transmitted to the database D4210 included in the controller 42 of the processing plant 4.

FIG. 3 is an explanatory diagram of information processing in the processing plant according to the first embodiment. FIG. 3 illustrates the storage state of the $CO_2$ tank 412 in the processing plant 4 and the information processing in the database D4210 in a corresponding manner. In the processing plant 4, $CO_2$ stored in the $CO_2$ tank 412 is sequentially allocated to the identification information of a user whose collection start time is earlier. For example, in the database D4210 that stores the information in which the user identification information, the $CO_2$ collection start time, the amount of collection of $CO_2$, and the amount of use of $CO_2$ are linked with each other, the linked information is sorted in ascending order of the collection start time. In practice, it is not possible to distinguish which $CO_2$ in the $CO_2$ tank 412 is collected by which user, and thus this linking is for data processing. In the example illustrated in FIG. 3, the user A, the user C, and the user B are sorted in this order. Information processing is then performed to link the amount of collection with the amount of use (for example, amount of use subjected to process of conversion into fuel) in the sorted order, that is, in ascending order of the collection start time. For example, assuming that the amount of $CO_2$ used for conversion into fuel is (30), information processing is performed first to link the amount (20) of collection of $CO_2$ of the user A whose collection start time is the earliest with the amount of use of $CO_2$. The remaining amount of use that is not linked is (30−20=10), which is indicated by V'. For V', information processing is performed to link the amount (15) of collection of $CO_2$ of the user C whose collection start time is the second earliest after the user A with the amount of use of $CO_2$. Since the remaining amount V' of use of $CO_2$, that is, (10) is less than the amount of collection of $CO_2$ of the user C, that is, (15), information processing is performed to link the remaining amount V' of (10) that may be linked out of the amount of collection of $CO_2$ with the amount of use of $CO_2$. The database D4210 is then updated with the amount (5) of collection of $CO_2$ that has not been linked as the amount of collection of $CO_2$ of the user C. The above processing is repeatedly performed every predetermined time interval. Similar information processing is performed on the amount used for photosynthesis. This linking will be described later in more detail using flow charts.

FIG. 4 is an explanatory diagram of the database F of the information management center according to the first embodiment. The information about the amount of $CO_2$ collected at the $CO_2$ collection station 2A, the amount of $CO_2$ used in the processing plant 4, the date of use, and the intended use, and the information about the total amount of use of $CO_2$ are stored in the database F5010 for each of the pieces of user identification information.

Figure 5:
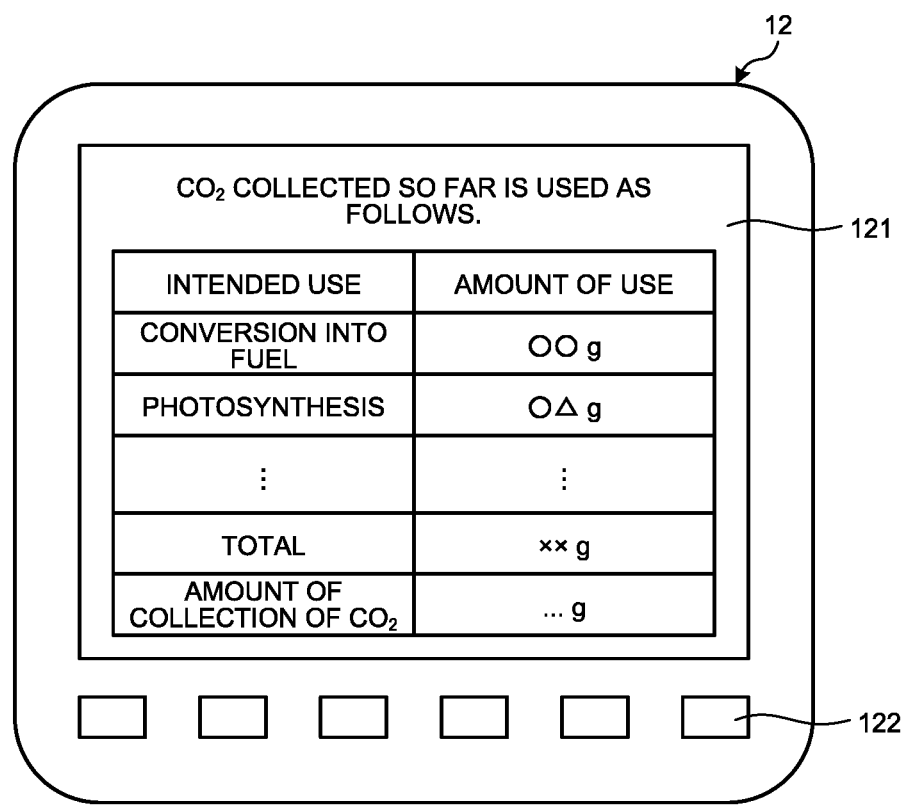
FIG. 5 is an explanatory diagram of an information communication terminal 12 according to the first embodiment.

FIG. 5 is an explanatory diagram of the information communication terminal 12 according to the first embodiment. When a display command is input from a user through the input unit 122 exemplified as buttons displayed on a touch panel, the information about the amount of collection of $CO_2$, the amount of use of $CO_2$, and the intended use of $CO_2$ is output to the output unit 121 as illustrated in FIG. 5.

Control Flow

Figure 6A:
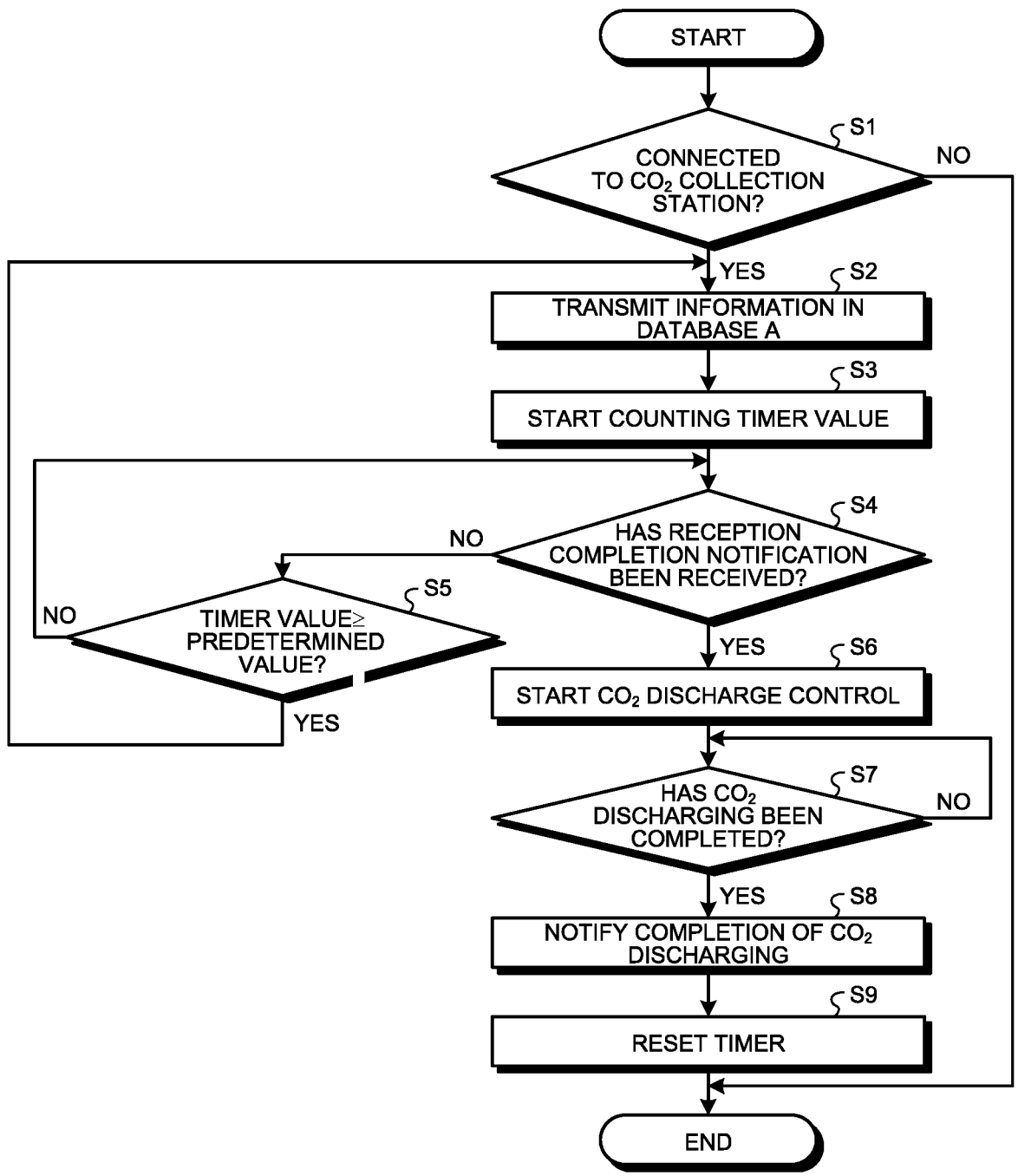
FIG. 6A is a control flowchart performed by a vehicle according to the first embodiment.
Figure 6B:
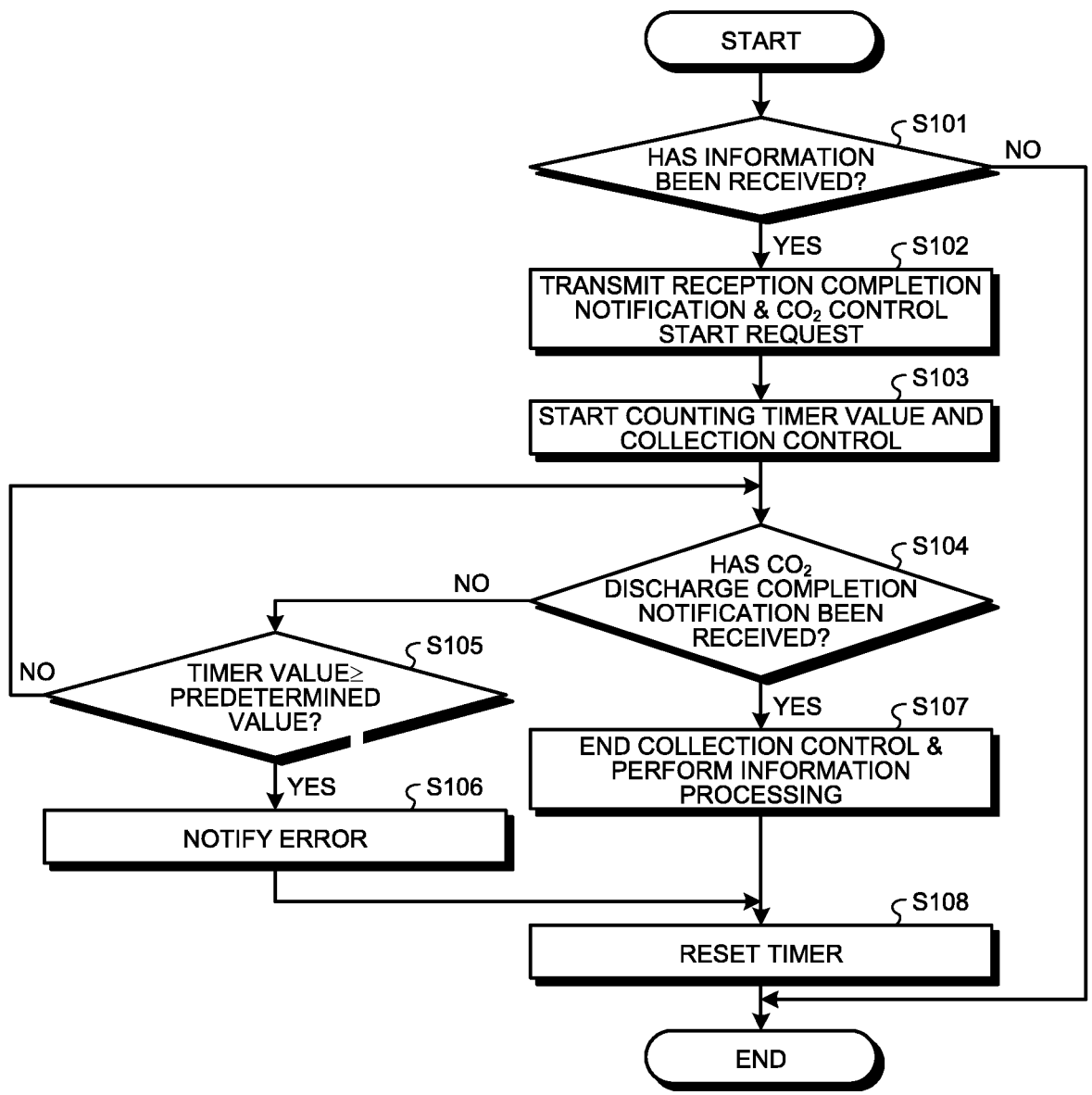
FIG. 6B is a control flowchart performed by the $CO_2$ collection station according to the first embodiment.

FIGS. 6A and 6B are control flowcharts performed by the vehicle and the $CO_2$ collection station according to the first embodiment. While the vehicle 1A and the $CO_2$ collection station 2A will be described, similar control is executed in other vehicles 1B and 1C and the $CO_2$ collection station 2B.

FIG. 6A will be described first. At step S1, the $CO_2$ recovery control unit 101 determines whether or not the $CO_2$ recovery unit 100 is connected to the $CO_2$ collection unit 200 of the $CO_2$ collection station 2A, based on connection information detected by the connection sensor of the $CO_2$ recovery unit 100. When the $CO_2$ recovery unit 100 is not connected to the $CO_2$ collection unit 200 (step S1: No), the control flow ends. When the $CO_2$ recovery unit 100 is connected to the $CO_2$ collection unit 200 (step S1: Yes), the control unit 110 causes the communication unit 120 to transmit identification information of the user of the $CO_2$ recovery device 10 stored in the database A1110 of the storage unit 111 to the $CO_2$ collection station 2A (step S2), and the process proceeds to step S3.

At step S3, the control unit 110 starts counting a timer value from the time of the transmission at step S2, and the process proceeds to step S4.

At step S4, the control unit 110 determines whether or not a reception completion notification and a $CO_2$ discharge control start request have been received from the $CO_2$ collection station 2A via the communication unit 120. When the reception completion notification and the $CO_2$ discharge control start request have not been received (step S4: No), the process proceeds to step S5.

At step S5, the control unit 110 determines whether or not the counted timer value is more than or equal to a predetermined value. When the timer value is less than the predetermined value (step S5: No), the process returns to step S4. If the timer value is more than or equal to the predetermined value (step S5: Yes), the process returns to step S2.

At step S4, when the reception completion notification and the $CO_2$ discharge control start request are received (step S4: Yes), the $CO_2$ recovery control unit 101 causes the $CO_2$ recovery unit 100 to discharge $CO_2$ from the $CO_2$ tank 102 into the $CO_2$ collection unit 200 of the $CO_2$ collection station 2A (step S6), and the process proceeds to step S7.

At step S7, the $CO_2$ recovery control unit 101 determines whether or not discharging from the $CO_2$ tank 102 has been completed, based on remaining amount information detected by the storage amount sensor of the $CO_2$ tank 102. When discharging has not been completed (step S7: No), step S7 is repeated until discharging is completed. When discharging has been completed (step S7: Yes), the $CO_2$ recovery control unit 101 causes the communication unit 120 to transmit a $CO_2$ discharge completion notification to the $CO_2$ collection station 2A (step S8), and the process proceeds to step S9.

At step S9, the control unit 110 resets the counted timer value and ends the control flow.

Next, FIG. 6B will be described. At step S101, the control unit 212 determines whether or not user identification information has been received from the vehicle 1A every time a predetermined time elapses. When the identification information has not been received (step S101; No), the control flow ends. When the identification information has been received (step S101), the control unit 212 transmits a reception completion notification and a $CO_2$ discharge control start request to the vehicle 1A (step S102), and the process proceeds to step S103.

At step S103, the control unit 212 starts counting a timer value from the time of the transmission at step S102, the $CO_2$ collection control unit 201 starts $CO_2$ collection control, and the process proceeds to step S104.

At step S104, the control unit 212 determines whether or not a $CO_2$ discharge completion notification has been received from vehicle 1A. When the $CO_2$ discharge completion notification has not been received (step S104: No), it is determined whether or not the timer value is more than or equal to a predetermined value (step S105).

When the timer value is less than the predetermined value at step S105 (step S105: No), the process returns to step S104. When the timer value is more than or equal to the predetermined value (step S105: Yes), the control unit 212 notifies an error notification to a manager of the $CO_2$ collection station 2A or the like via the communication unit 210 (step S106), and the process proceeds to step S108.

At step S104, when the $CO_2$ discharge completion notification is received (step S104: Yes), the process proceeds to step S107.

At step S107, the $CO_2$ collection control unit 201 ends the $CO_2$ collection control, and the control unit 212 performs information processing to link the user identification information received from the vehicle 1A with the amount of collection of $CO_2$ and the collection start time, stores the linked information in the database B2110 of the storage unit 211, and the process proceeds to step S108.

At step S108, the control unit 212 resets the counted timer value and ends the control flow.

Figure 7A:
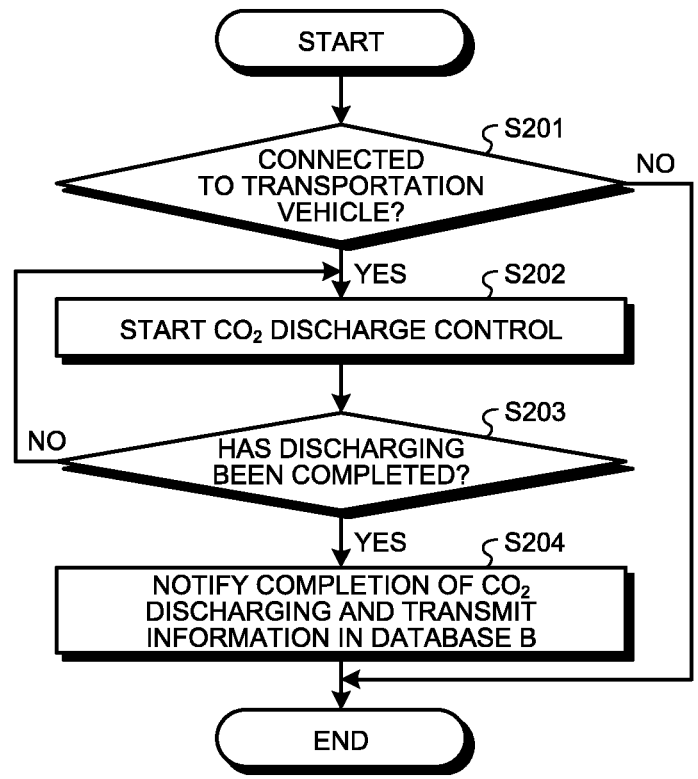
FIGS. 7A and 7B are control flowcharts performed by the $CO_2$ collection station and a transportation vehicle according to the first embodiment, respectively.
Figure 7B:
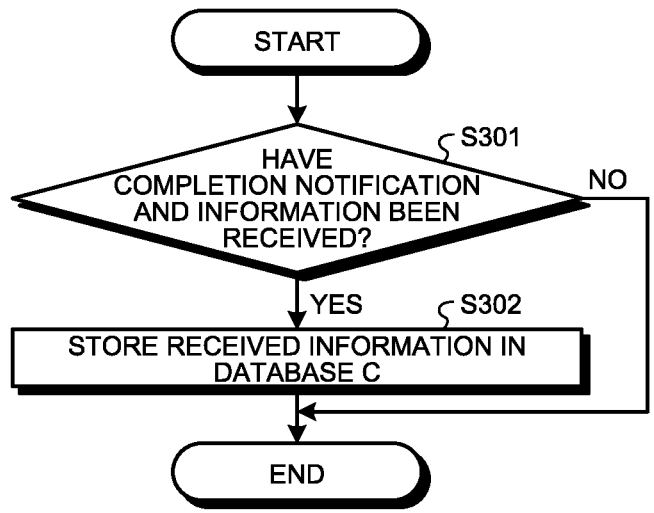

FIGS. 7A and 7B are control flowcharts performed by the $CO_2$ collection station and the transportation vehicle according to the first embodiment, respectively. FIG. 7A is a control flowchart performed by the $CO_2$ collection station, and FIG. 7B is a control flowchart performed by the transportation vehicle.

FIG. 7A will be described first. At step S201, the $CO_2$ collection control unit 201 determines whether or not the $CO_2$ collection unit 200 is connected to the $CO_2$ collection unit 300 of the transportation vehicle 3, based on connection information detected by the connection sensor of the $CO_2$ collection unit 200. When the $CO_2$ collection unit 200 is not connected to the $CO_2$ collection unit 300 (step S201: No), the control flow ends. When the $CO_2$ collection unit 200 is connected to the $CO_2$ collection unit 300 (step S201: Yes), the process proceeds to step S202.

At step S202, the $CO_2$ collection control unit 201 starts control to discharge $CO_2$ into the $CO_2$ tank 202, and the process proceeds to step S203.

At step S203, the $CO_2$ collection control unit 201 determines whether or not discharging of $CO_2$ has been completed based on the remaining amount of the $CO_2$ tank. When discharging has not been completed (step S203: No), step S203 is repeated until discharging is completed. When discharging has been completed (step S203: Yes), the control unit 212 causes the communication unit 210 to transmit a $CO_2$ discharge completion notification and the information stored in the database B2110 (information in which user identification information, amount of collection of $CO_2$, and collection start time are linked with each other) to the transportation vehicle 3 (step S204), and the control flow ends.

Next, FIG. 7B will be described. At step S301, the control unit 312 determines whether or not the $CO_2$ discharge completion notification and the information in the database B2110 have been received from the $CO_2$ collection station 2A via the communication unit 310 every time a predetermined time elapses. When the completion notification and the information have not been received (step S301: No), the control flow ends. When the completion notification and the information have been received (step S301: Yes), the control unit 312 stores the received information in the database C3110 of the storage unit 311 (step S302), and the control flow ends.

Figure 8A:
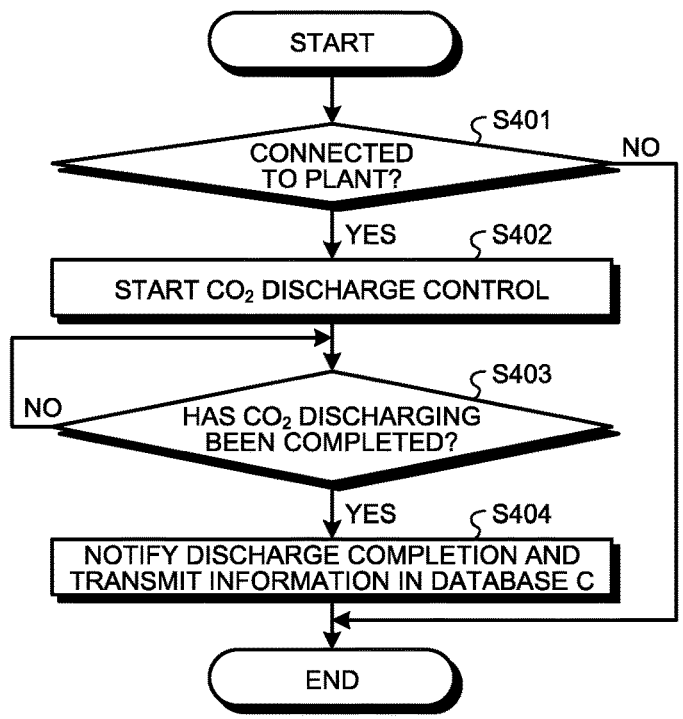
FIGS. 8A and 8B are control flowcharts performed by the transportation vehicle and the processing plant according to the first embodiment, respectively.
Figure 8B:
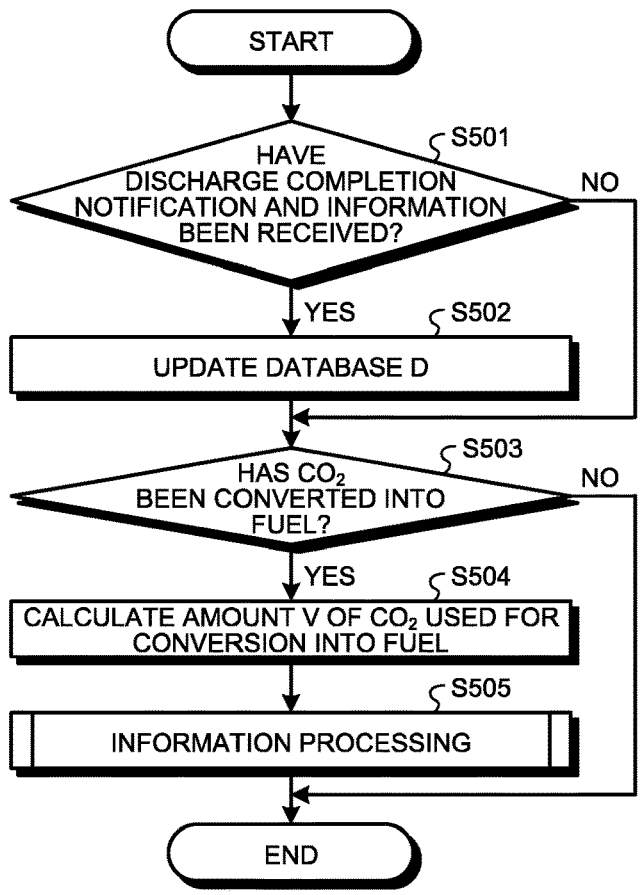

FIGS. 8A and 8B are control flowcharts performed by the transportation vehicle and the processing plant according to the first embodiment, respectively. FIG. 8A is a control flowchart performed by the transportation vehicle, and FIG. 8B is a control flowchart executed by the processing plant. While FIG. 8B describes a case of use for a process of conversion into fuel, similar control is executed in a case of use for photosynthesis.

FIG. 8A will be described first. At step S401, the $CO_2$ collection control unit 301 determines whether or not the $CO_2$ collection unit 300 is connected to the $CO_2$ collection unit 410 of the processing plant 4, based on connection information detected by the connection sensor of the $CO_2$ collection unit 300. When the $CO_2$ collection unit 300 is not connected to the $CO_2$ collection unit 410 (step S401: No), the control flow ends. When the $CO_2$ collection unit 300 is connected to the $CO_2$ collection unit 410 (step S401: Yes), the $CO_2$ collection unit 300 starts $CO_2$ discharge control (step S402), and the process proceeds to step S403.

At step S403, the $CO_2$ collection control unit 301 determines whether or not discharging of $CO_2$ has been completed, based on remaining amount information detected by the storage amount sensor of the $CO_2$ tank 302. When discharging has not been completed (step S403: No), step S403 is repeated until discharging is completed. When discharging has been completed (step S403: Yes), the control unit 312 causes the communication unit 420 to transmit a discharge completion notification and information in the database C3110 (information in which user identification information, amount of collection of $CO_2$, and collection start time are linked with each other) to the processing plant 4 (step S404), and the control flow ends.

Next, FIG. 8B will be described. At step S501, the control unit 423 determines whether or not the $CO_2$ discharge completion notification and the information in the database C3110 have been received from the transportation vehicle 3 every time a predetermined time elapses. When the discharge completion notification and the information have not been received (step S501: No), the process proceeds to step S503. When the completion notification and the information have been received (step S501: Yes), the processor 422 updates the information in the database D4210 using the information received (step S502), and the process proceeds to step S503.

At step S503, the control unit 423 determines whether or not $CO_2$ in the $CO_2$ tank 412 has been used for conversion into fuel in the $CO_2$ processing device 40, based on a change in the amount of $CO_2$ in the $CO_2$ tank 412, the change being detected by the storage amount sensor. When $CO_2$ has not been used for conversion into fuel (step S503: No), the control flow ends. When $CO_2$ has been used for conversion into fuel (step S503: Yes), the processor 422 calculates the amount of $CO_2$ used for conversion into fuel (amount of use of $CO_2$) V (step S504), and the process proceeds to step S505.

At step S505, the processor 422 performs information processing to link the user identification information and the information about the amount of collection of $CO_2$ among the information received from the transportation vehicle 3 and stored in the database D4210 with the intended use of $CO_2$ (conversion into fuel) and the amount of $CO_2$ used for conversion into fuel and to store the linked information in the database E4211, and the control flow ends.

Figure 9:
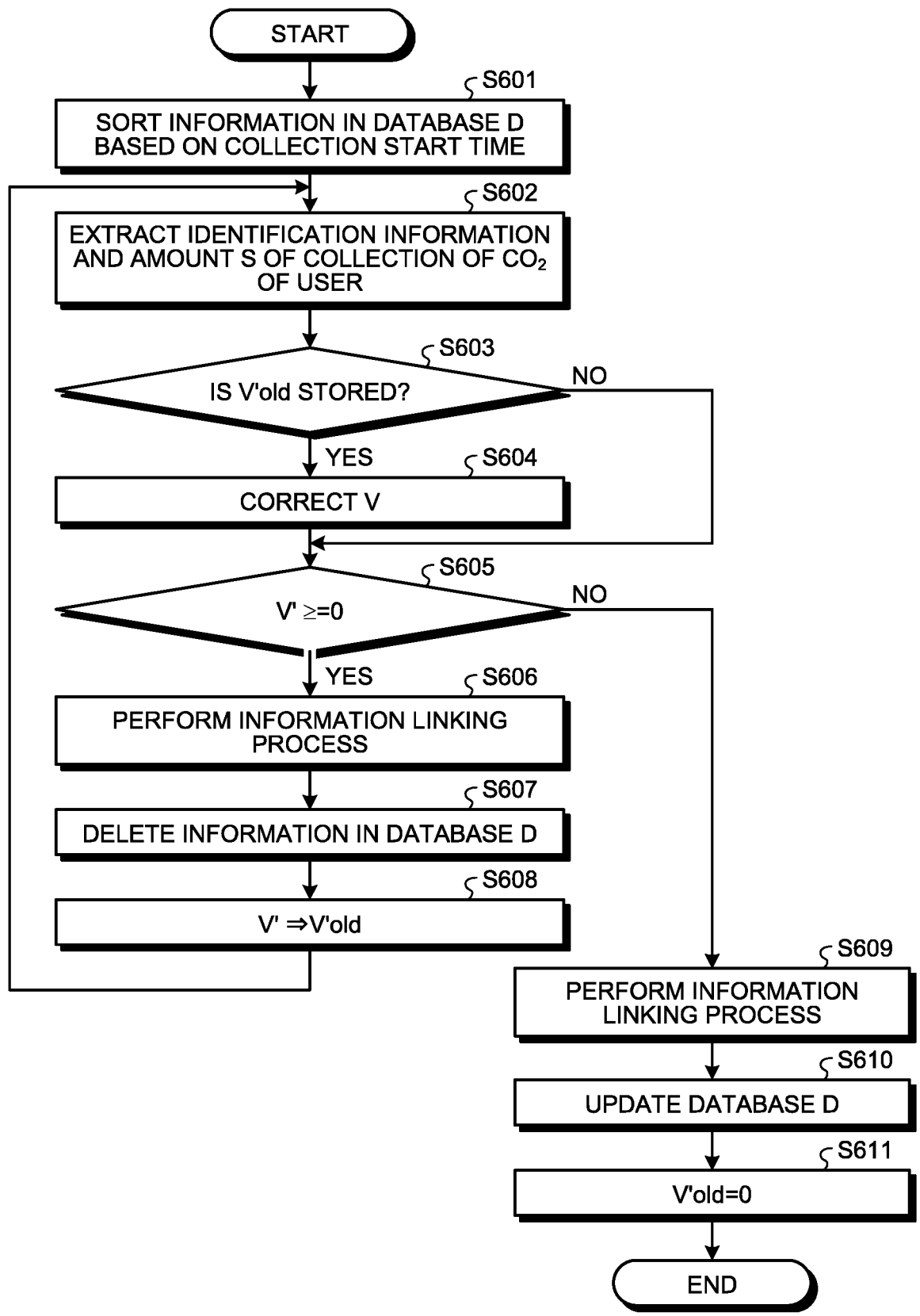
FIG. 9 is a control flowchart of information processing performed by the processing plant according to the first embodiment.

FIG. 9 is a control flowchart of information processing performed by the processing plant 4 according to the first embodiment.

At step S601, the processor 422 sorts the information in the database D4210 in ascending order of the $CO_2$ collection start time, and the process proceeds to step S602.

At step S602, the processor 422 extracts identification information of a user whose $CO_2$ collection start time is the earliest and an amount S of collection of $CO_2$ of the user from the database D4210, and the process proceeds to step S603.

At step S603, the processor 422 determines whether or not a previous remaining processing amount V'old (amount of use not linked with amount of collection) is stored in the storage unit 421. When V'old is not stored (step S603: No), the process proceeds to step S605. When V'old is stored (step S603: Yes), the processor 422 performs a correction to add the previous remaining processing amount V'old to the amount of $CO_2$ used for conversion into fuel, which has been calculated at step S504, and deletes the information about the previous remaining processing amount V'old from the storage unit 421 (step S604), and the process proceeds to step S605.

At step S605, the processor 422 determines whether or not a difference V' (=V−S) between the amount V of $CO_2$ used for conversion into fuel, the amount V beings calculated by the processor 422, or the amount V of use of $CO_2$ corrected at step S604 and the amount S of collection of $CO_2$ of the user, the amount S being extracted at step S602, is more than or equal to 0. When V' is less than 0, that is, when the amount S of collection of $CO_2$ is more than the amount V of use of $CO_2$ (step S605: No), the process proceeds to step S609. When V' is more than or equal to 0, that is, when the amount S of collection of $CO_2$ is less than the amount V of use of $CO_2$ (step S605: Yes), the processor 422 performs a process corresponding to the determination that all the amount S of collection of $CO_2$ of the user is used. That is, the user identification information, the amount S of collection of $CO_2$, and the amount V used for conversion into fuel are linked with each other and stored in the database E4211 (step S606). Thereafter, the control process proceeds to step S607.

At step S607, the information about the user stored in the database D4210, which has been linked, is deleted. Thereafter, the control process proceeds to step S608.

At step S608, the processor 422 stores the difference V' as V'old in the storage unit 421, and the process returns to step S602.

At step S609, the processor 422 performs a process corresponding to the determination that, out of the amount S of collection of $CO_2$, the amount V of $CO_2$ to be converted into fuel has been converted into fuel. That is, the user identification information, the amount S of collection of $CO_2$, and the amount V of $CO_2$ used for conversion into fuel are linked with each other and stored in the database E4211, and the process proceeds to step S610.

At step S610, the database D4210 is updated by changing the amount S of collection of $CO_2$ of the user stored in the database D4210 to the absolute value of the difference V'

(amount of collection of $CO_2$ that has not been used for conversion into fuel), the process proceeds to step S611.

At step S611, the processor 422 stores the amount of difference V'old as 0 in the storage unit 421, and the control flow ends.

As described above, the information processing is performed to link the amount of collection of $CO_2$ with the amount of use of $CO_2$ in an order from the user whose $CO_2$ collection start time is the earliest in the $CO_2$ collection device.

The control flowchart of FIG. 9 will be specifically described with reference to FIG. 3.

The processor 422 sorts the information in the database D4210 in ascending order of the $CO_2$ collection start time as in the table on the upper right side of FIG. 3 (step S601).

Next, the identification information of the user A whose $CO_2$ collection start time is the earliest and the amount (20) of collection of $CO_2$ are extracted (step S602).

Next, at step S603, the control unit 423 determines that the previous remaining processing amount V'old is not stored (it is assumed that V'old is not stored).

Next, the processor 422 calculates the difference V' (=30−20) between the amount (30) of use of $CO_2$ and the amount (20) of collection of $CO_2$ of the user A, determines that V' is more than or equal to 0 (Step S605), links the identification information of the user A, the amount (20) of use of $CO_2$, the amount (20) of collection of $CO_2$, and intended use information indicating conversion into fuel with each other, and stores the linked information in the database E4211 (step S606).

Next, the processor 422 deletes the information about the user A from the database D4210 as illustrated in the table on the middle right side of FIG. 3 (step S607).

Next, the processor 422 stores the difference V' (10) calculated at step S605 as V'old in the storage unit 421 (step S608).

Next, the control process returns to step S602, and the processor 422 extracts the identification information of the user C whose collection start time is the second earliest after the user A and the amount (15) of collection of $CO_2$.

Next, since the previous remaining processing amount V'old is determined as (10) at step S603 and stored at step S608, the processor 422 performs a correction to add the previous remaining processing amount V'old to the amount V of use of $CO_2$ (Step S604). Here, it is assumed that the amount of use of $CO_2$ for new conversion into fuel is 0, and thus the corrected amount V of use of $CO_2$ is the previous remaining processing amount V'old (10).

Next, the processor 422 calculates the difference V' (=10−15=−5) between the corrected amount (10) of use of $CO_2$ and the amount (15) of collection of $CO_2$ of the user C, determines that V' is less than 0 (Step S605), links the identification information of the user C, the amount (10) of use of $CO_2$, the amount (15) of collection of $CO_2$, and the intended use information indicating conversion into fuel with each other, and stores the linked information in the database E4211 (step S609).

Next, the processor 422 updates the information stored in the database D4210 by storing the absolute value (5) of the difference V' calculated at step S605 described above (out of amount of collection of $CO_2$ of user C, amount not used for conversion into fuel) as the amount of $CO_2$ of the user C (step S610).

Next, the processor 422 stores the remaining processing amount V'old as 0 in the storage unit 421 (step S611), and the control flow ends.

As described above, the extraction process and the linking process are repeatedly performed in ascending order of the $CO_2$ collection start time.

Figure 10A:
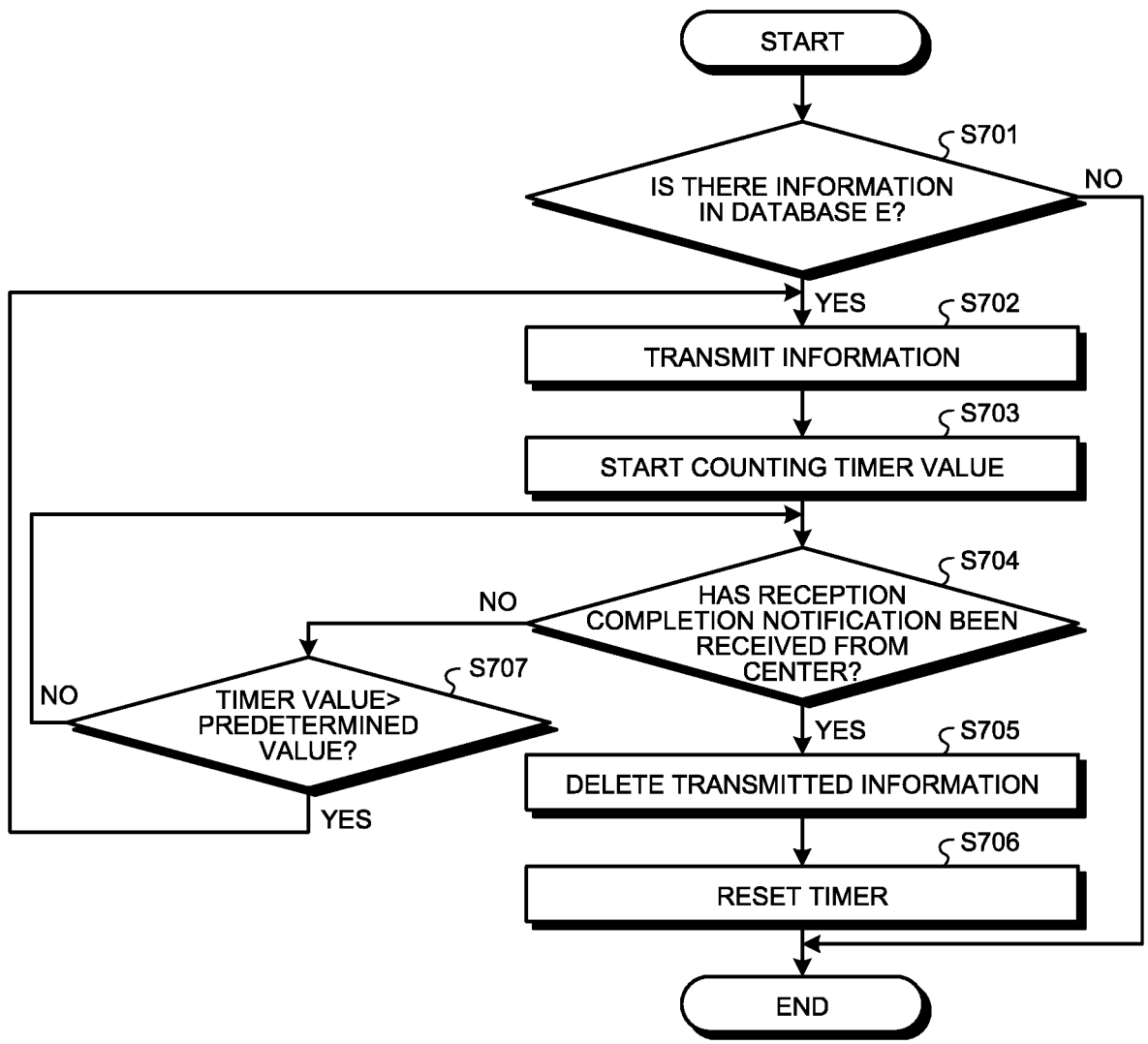
FIG. 10A is a control flowchart performed by the processing plant according to the first embodiment.

FIGS. 10A and 10B are control flowcharts performed by the processing plant and the information management center according to the first embodiment, respectively. FIG. 10A is a control flowchart performed by the processing plant 4, and FIG. 10B is a control flowchart performed by the information management center.

FIG. 10A will be described first. At step S701, the control unit 423 determines whether or not there is information stored in the database E4211. When there is no information (step S701: No), the control flow ends. When there is information (step S701: Yes), the process proceeds to step S702.

At step S702, the control unit 423 causes the communication unit 420 to transmit the information in the database E4211 to the information management center 5, and the process proceeds to step S703.

At step S703, the control unit 423 starts counting a timer value from the time of the transmission at step S702, and the process proceeds to step S704.

At step S704, the control unit 423 determines whether or not a reception completion notification has been received from the information management center 5. When the notification has not been received (step S704: No), the process proceeds to step S707. When the notification has been received (step S704: Yes), the control unit 423 causes the processor 422 to delete the transmitted information from the database E4211 (step S705), and the process proceeds to step S706.

At step S706, the control unit 423 resets the timer value, and the control flow ends.

At step S707, the control unit 423 determines whether or not the counted timer value is more than a predetermined value. When the timer value is less than or equal to the predetermined value (step S707: No), the process proceeds to step S704. When the timer value is more than the predetermined value (step S707: Yes), the process returns to step S702.

Next, FIG. 10B will be described. At step S801, the control unit 503 determines whether the information in the database E4211 has been received from the processing plant 4. When the information has not been received (step S801: No), the control flow ends. When the information has been received (step S801: Yes), the process proceeds to step S802.

At step S802, the processor 502 determines whether or not the received information is already stored and the received information is about a user already registered in the database F5010. When the received information is already registered, based on the received information, the information about the intended use of $CO_2$ (conversion into fuel) and the information about the amount of use of $CO_2$, these pieces of information being collected from the user, are updated (step S803), and the process proceeds to step S805. When the received information is not stored, the received information is newly added to the database F5010 (step S804), and the process proceeds to step S805.

At step S805, the processor 502 determines whether the process of updating or adding all the received information has been completed. When the process has not been completed (step S805: No), the process returns to step S802. When the process has been completed (step S805: Yes), the process proceeds to step S806.

At step S806, the control unit 503 causes the communication unit 500 to transmit a reception completion notification to the processing plant 4, and the control flow ends.

Figure 11A:
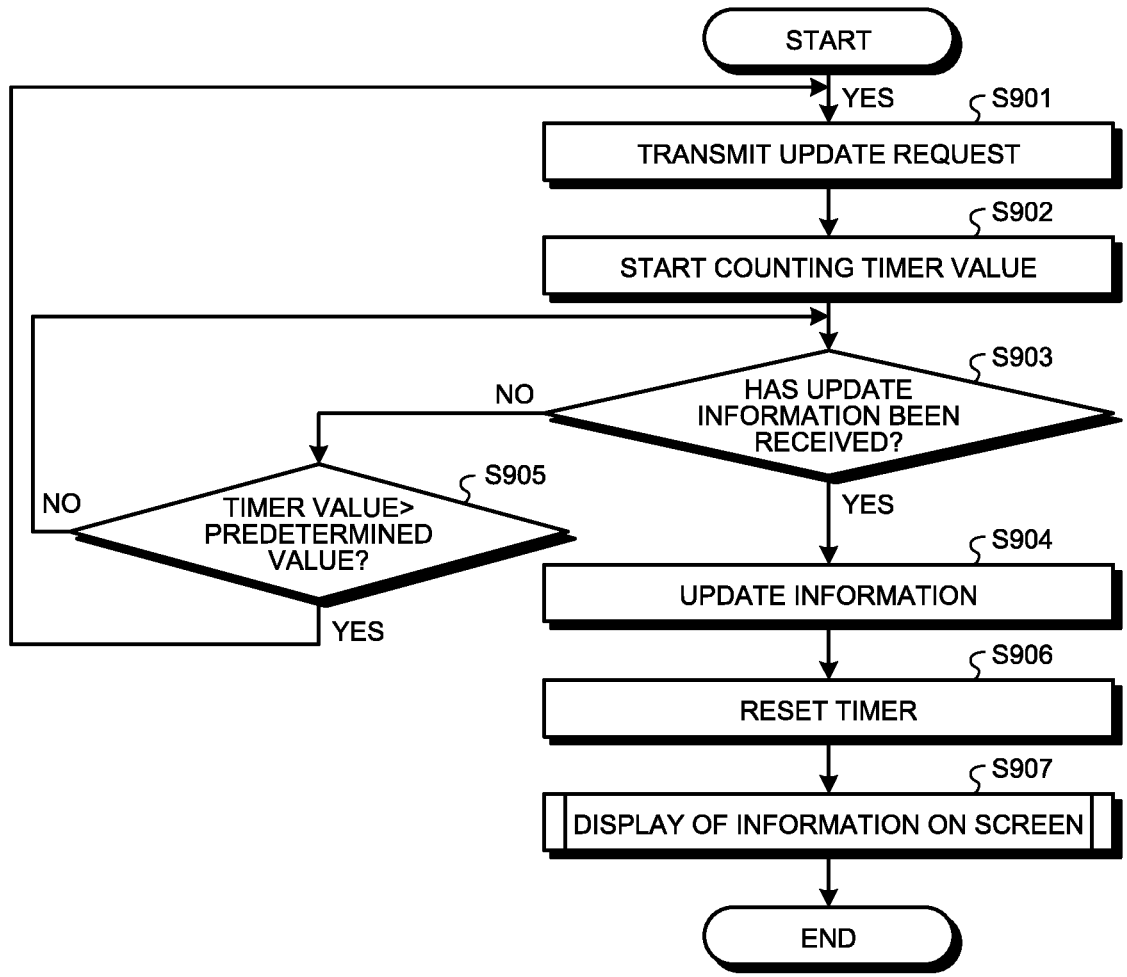
FIGS. 11A and 11B are control flowcharts performed by the vehicle and the information management center according to the first embodiment, respectively.
Figure 11B:
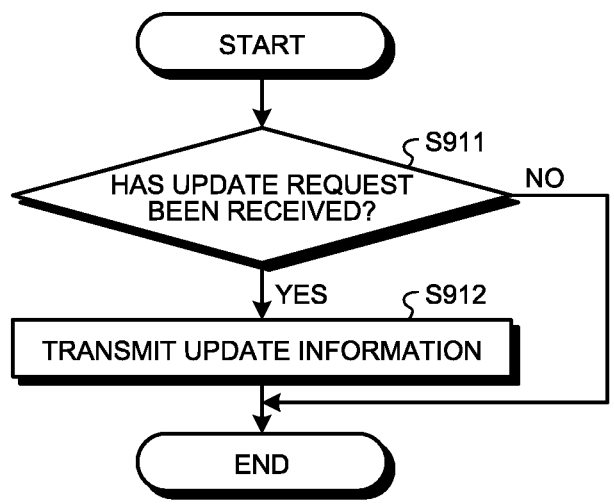

FIGS. 11A and 11B are control flowcharts performed by the vehicle and the information management center according to the first embodiment, respectively. FIG. 11A is a control flowchart performed by the vehicle 1A, and FIG. 11B is a control flowchart performed by the information management center 5. The control flowchart performed by the vehicle 1A illustrated in FIG. 11A will be described first. Similar control is executed in other vehicles 1B and 1C.

At step S901, the control unit 110 causes the communication unit 120 to transmit a request to update information about the amount of use and intended use of $CO_2$ to the information management center 5 every time a predetermined time elapses, and the process proceeds to step S902.

At step S902, the control unit 110 starts counting a timer value from the time of the transmission at step S901, and the process proceeds to step S903.

At step S903, the control unit 110 determines whether or not update information has been received via the communication unit 120. When the update information has not been received (step S903: No), the control unit 110 determines whether or not the timer value is more than a predetermined value (step S905). When the timer value is less than or equal to the predetermined value (step S905: No), the process returns to step S903, and when the timer value is more than the predetermined value (step S905: Yes), the process returns to step S901.

When the update information is received at step S903 (step S903: Yes), the control unit 110 updates the information in the database A1110 based on the received information (step S904), and then the control unit 110 resets the timer value (step S906), and the process proceeds to step S907.

At step S907, control unit 110 causes the information communication terminal 12 to display the resultant information on a screen based on a user's request, and ends the control flow. A specific control flow of displaying the information on the screen will be described with reference to FIG. 12.

Next, a control flowchart performed by the information management center 5 illustrated in FIG. 11B will be described.

At step S911, the control unit 503 determines whether or not the update request has been received from the vehicle 1A via the communication unit 500. When the update request has not been received (step S911: No), the control flow ends. When the update request has been received (step S911: Yes), the control unit 503 causes the communication unit 500 to transmit the information in the database F5010 to the vehicle 1A (step S912), and the control flow ends.

Figure 12:
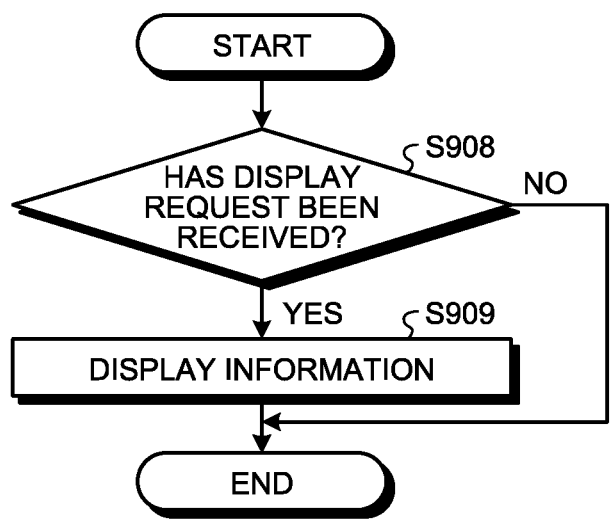
FIG. 12 is a control flowchart performed by the information communication terminal according to the first embodiment.

FIG. 12 is a control flowchart performed by the information communication terminal according to the first embodiment.

At step S908, the terminal control unit 123 determines whether or not a request to display information about the amount of use and intended use of $CO_2$ has been input from a user of the $CO_2$ recovery device 10 through the input unit 122. When the display request has not been input (step S908: No), the control flow ends. When the display request has been input (step S908: Yes), the terminal control unit 123 causes the output unit 121 to display the information about the amount of use and intended use of $CO_2$, the information being stored in the storage unit 111, (step S909), and the control flow ends.

In this way, with respect to $CO_2$ that is recovered by the $CO_2$ recovery device 10 of the vehicles 1A, 1B, and 1C and collected at the $CO_2$ collection stations 2A and 2B, the identification information of the user of the $CO_2$ recovery device 10, the amount of recovery of $CO_2$, and the information about the intended use and amount of use of $CO_2$ may be managed between the vehicles 1A, 1B, and 1C, the $CO_2$ collection stations 2A and 2B, the transportation vehicle 3, the processing plant 4, and the information management center 5. Furthermore, since the user of the $CO_2$ recovery device 10 may check the information indicating the intended use of $CO_2$ collected, the user is aware of $CO_2$ recovery and social contribution, which raises user's motivation, and as a result of that, the $CO_2$ recovery may be promoted. In addition, as information processing is performed to link the amount of collection of $CO_2$ with the amount of use of $CO_2$ in an order from the user whose $CO_2$ collection start time in the $CO_2$ collection device 20 is the earliest, the earlier $CO_2$ is collected, the earlier $CO_2$ is used, and the user is aware of early recovery of $CO_2$ to be highly motivated. Further, since information may be updated or added to the database or the like, the user may recognize the latest information about the intended use and amount of use of $CO_2$. Moreover, a new user may be easily added to the information management system 1000, and may recognize the intended use information. In addition, new intended use may be easily added to the information management system 1000.

While the vehicles 1A, 1B, and 1C include the $CO_2$ recovery device 10 in the first embodiment described above, the $CO_2$ recovery device 10 may be provided in other structures that emit $CO_2$. For example, the $CO_2$ recovery device 10 may be provided in a house such as a detached house or a condominium, a public facility, or a building such as a factory.

While the user is, for example, the owner of the vehicle 1A including the $CO_2$ recovery device 10 in the first embodiment described above, in a case where the vehicle 1A is a vehicle used for services such as car rental and car sharing, the user may be a user of the service or a service provider. When the user is a service user, the intended use information may be shared when a plurality of different vehicles is used. When the user is a service provider, the intended use information may be shared with vehicles. When the $CO_2$ recovery device 10 is provided in a rental building, the user may be the owner or the borrower.

While the processing plant 4 has a plurality of intended uses such as the use of $CO_2$ for conversion into fuel and the use of $CO_2$ for photosynthesis of plants in the first embodiment described above, each processing plant has a single intended use like a plant dedicated for conversion into fuel. When $CO_2$ collected from the $CO_2$ recovery device 10 of a certain user is used in a different processing plant ($CO_2$ using facility), user identification information and intended use information are transmitted from each processing plant to the information management center 5, and managed collectively. In addition, the intended use of $CO_2$ in the $CO_2$ using facility is not limited to conversion into fuel and photosynthesis, and for example, the use of $CO_2$ for generating carbon dioxide gas may be included.

Further, while $CO_2$ is transported from the $CO_2$ collection stations 2A and 2B to the processing plant 4 by the transportation vehicle 3 in the first embodiment described above, $CO_2$ may be transported by other transportation such as a ship or a railroad, or may be transported by a pipeline or the like. When the pipeline is used, for example, information is directly transmitted from the $CO_2$ collection stations 2A and 2B to the processing plant 4 via the communication network 6.

Moreover, whether or not $CO_2$ has been actually used for conversion into fuel is determined and then the amount V of $CO_2$ converted into fuel is calculated, and the information processing is performed to link the amount of collection of $CO_2$ with the amount of use of $CO_2$ in the first embodiment described above, but a virtual amount V of $CO_2$ used for conversion into fuel may be set before $CO_2$ is used, and then the information processing of linking may be performed.

Further, in the first embodiment described above, while the linked information is sorted in ascending order of the collection start time in the database D4210, the sorting does not need to be performed, and the information with the earliest collection start time among the linked information may be extracted.

Furthermore, while the information communication terminal 12 displays intended use information in a table format in the first embodiment described above, the intended use information may be displayed in a graph format such as a pie graph or a bar graph. In addition, the processing plant 4 may transmit its own positional information to the information management center 5, and the information communication terminal 12 may display in which area $CO_2$ is used. The information to be displayed and the display format may be switched by an operation of the input unit 122.

According to the present disclosure, it is possible to inform a user who uses a $CO_2$ recovery device of information such as the intended use and amount of use of $CO_2$ recovered from the $CO_2$ recovery device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information management system comprising:
a plurality of $CO_2$ recovery devices configured to recover $CO_2$;
a $CO_2$ collection station configured to collect $CO_2$ recovered by the plurality of $CO_2$ recovery devices;
a $CO_2$ using facility configured to use $CO_2$ collected at the $CO_2$ collection station; and
an information management device including a communication unit configured to transmit linked information in which intended use information indicating intended use of $CO_2$ in the $CO_2$ using facility and an amount of use for the intended use is linked with identification information of a user of each of the plurality of $CO_2$ recovery devices to an information communication terminal used by the user.

2. The information management system according to claim 1, wherein the $CO_2$ using facility includes
a processing device configured to process $CO_2$ recovered by the plurality of $CO_2$ recovery devices,
a memory configured to store linked information in which identification information of the user is linked with intended use information indicating intended use of $CO_2$ in the processing device and an amount of use for the intended use, and
a communication unit configured to transmit the linked information stored in the memory.

3. The information management system according to claim 1, wherein the $CO_2$ collection station includes
a collection device configured to collect $CO_2$ from the plurality of $CO_2$ recovery devices,
a memory configured to store linked information in which identification information of the user is linked with information about an amount of collection of $CO_2$, and
a communication unit configured to transmit the linked information stored in the memory.

4. The information management system according to claim 1, wherein the information management device includes
a receiver configured to receive intended use information indicating intended use of $CO_2$ in the $CO_2$ using facility and an amount of use for the intended use, and identification information of the user,
a processor configured to process information received by the receiver,
a memory configured to store information processed by the processor, and
a transmitter configured to transmit information stored in the memory to an information communication terminal used by the user.

5. The information management system according to claim 4, wherein the processor of the information management device is configured to perform a process to link the intended use information with identification information of the user.

6. The information management system according to claim 1, wherein the information communication terminal includes
a communication unit configured to receive the linked information, and
an output unit configured to output the intended use information.

7. The information management system according to claim 1, further comprising a vehicle including one of the plurality of $CO_2$ recovery devices and the information communication terminal.

8. The information management system according to claim 1, further comprising a building including one of the plurality of $CO_2$ recovery devices and the information communication terminal.

9. The information management system according to claim 1, wherein the intended use information includes information in which an amount of collection of $CO_2$ is linked with an amount of use of $CO_2$ in the $CO_2$ using facility in an ascending order of a $CO_2$ collection start time when $CO_2$ starts to be collected from the $CO_2$ recovery device at the $CO_2$ collection station.

10. The information management system according to claim 1, wherein the $CO_2$ using facility includes a processor configured to link the intended use information with identification information of the user in an ascending order of a $CO_2$ collection start time when $CO_2$ starts to be collected from the $CO_2$ recovery device at the $CO_2$ collection station.

11. An information management device comprising:
a receiver configured to receive: intended use information indicating intended use of $CO_2$ in a processing device configured to process $CO_2$ recovered by a $CO_2$ recovery device configured to recover $CO_2$ and an amount of use for the intended use; and identification information of a user of the $CO_2$ recovery device;
a processor configured to process information received by the receiver;
a memory configured to store information processed by the processor; and
a transmitter configured to transmit information stored in the memory to an information communication terminal used by the user.

12. The information management device according to claim 11, wherein the processor is configured to perform a process to link the intended use information with identification information of the user.

13. The information management device according to claim 11, wherein the intended use information includes information in which an amount of collection of $CO_2$ is linked with an amount of use of in an ascending order of a $CO_2$ collection start time when $CO_2$ starts to be collected from the $CO_2$ recovery device.

* * * * *